United States Patent [19]

Cadart et al.

[11] 4,216,273
[45] Aug. 5, 1980

[54] ELECTROCHEMICAL DEVICE WITH SOLID SEPARATOR AND SOLID ELECTROLYTE

[75] Inventors: François Cadart, Ceyrat; Alain Coulombeau, La Roche-Blanche, both of France

[73] Assignee: Compagnie Generale des Etablissements Michelin, Clermont-Ferrand, France

[21] Appl. No.: 966,398

[22] Filed: Dec. 4, 1978

[30] Foreign Application Priority Data

Dec. 15, 1977 [FR] France ................. 77 38168

[51] Int. Cl.² ........................................ H01M 10/44
[52] U.S. Cl. ..................................... 429/50; 429/104
[58] Field of Search ............................. 429/101–105, 429/222, 229, 218, 50

[56] References Cited

U.S. PATENT DOCUMENTS

| | | | |
|---|---|---|---|
| 3,214,296 | 10/1965 | Smotko | 136/6 |
| 3,245,836 | 4/1966 | Agruss | 429/103 X |
| 3,672,994 | 6/1972 | Mitoff | 136/6 |
| 3,837,918 | 9/1974 | Nakabayashi | 429/104 |
| 3,932,195 | 1/1976 | Evans et al. | 429/104 |
| 3,976,503 | 8/1976 | Minch et al. | 136/6 FS |
| 4,044,194 | 8/1977 | Evans et al. | 429/104 |

FOREIGN PATENT DOCUMENTS 1280511 11/1961 France .

OTHER PUBLICATIONS

Chem. Abstracts, vol. 82, No. 20, May 19, 1978, Abstract No. 127448a.
Nouveaux Generateurs Electriques a Electrodes de Sodium et de Brome Fonctionnant a Temp. Ambiante, Electr. Acta, 1974, vol. 19, No. 9, pp. 591–592.

Primary Examiner—Charles F. LeFevour
Attorney, Agent, or Firm—Brumbaugh, Graves, Donohue & Raymond

[57] ABSTRACT

Electrochemical device comprises a negative compartment and a positive compartment. The negative compartment contains a negative medium formed at least in part of a liquid metal, and the negative and positive compartments are separated by a solid separator which is capable of being traversed by ions of the metal and is a conductor of said ions. The device is characterized by the fact that the negative compartment contains a solid electrolyte which is a conductor of these ions, this electrolyte separating the negative compartment into two regions—on the one hand, a negative region containing the negative medium and a negative collector, and, on the other hand, an intermediate region, located between the separator and the electrolyte, containing an intermediate medium formed at least in part of the metal in liquid state and/or of at least one salt of the metal in dissolved or molten state.

12 Claims, 7 Drawing Figures

ELECTROCHEMICAL DEVICE WITH SOLID SEPARATOR AND SOLID ELECTROLYTE

This invention relates to electrochemical devices comprising at least one cell. This cell has at least one negative compartment, containing at least one metal in liquid state, and at least one positive compartment. These compartments are separated by a solid wall, known as a separator, through which ions of the metal migrate from one compartment to the other during the operation of the device. The expression "liquid state" means that during the operation of the device the metal is either in molten or dissolved state in one or more liquid solvents or else is in the state of a liquid alloy. The expression "electrochemical device" is to be understood in a very broad sense and includes all devices in which electrochemical reactions are carried out.

One device of this type is, for instance, an electrolytic device serving to prepare a metal by migration of its ions through the solid separator by means of an external source of current.

Another device of this type is, for instance, an electric current generator the active material of the negative electrode of which, contained in a negative compartment, is at least one liquid metal, in particular a metal of groups 1a, 2a, 2b, 3a of the periodic classification of elements ("Handbook of Chemistry and Physics," edited by "Robert C. Weast, Ph.D." and published in 49th edition by "The Chemical Rubber Co." of Cleveland in 1968-1969), particularly an alkali metal. These generators comprise a positive electrode, contained within a positive compartment, whose active material is at least one electron-acceptor substance, for instance a chalcogen, a metal salt, or a metal oxide. During the discharge of these generators, the metal oxidizes electrochemically, losing electrons, and produces ions which migrate through the separator towards the positive electrode.

The charging of these generators is effected, for instance, by means of an external source of current which causes a migration in reverse direction of the ions of the metal through the separator, that is to say from the positive electrode towards the negative electrode, these ions then capturing electrons in the negative compartment so as to reform the metal.

One generator in accordance with this definition is, for instance, a generator of the sodium-sulfur type in which the negative active material is sodium, in particular molten sodium, and the positive active material is sulfur and/or one or more sodium polysulfides, this active material being in particular in molten state.

These generators of the sodium-sulfur type employ, for instance, separators which are made of $\beta$-sodium alumina (beta) which can be represented by the formula $Na_2O.11Al_2O_3$ or $\beta''$-sodium alumina (beta second) which can be represented by the formula $Na_2O.5Al_2O_3$, or of a mixture of these sodium aluminas, these sodium aluminas possibly containing one or more additives. It is known that in these devices, and in particular in generators of the sodium-sulfur type, the instantaneous current densities must be limited, at every point of the separator, to predetermined maximum values which are related to the respective rates of diffusion of the active materials and/or of the reaction products at the positive electrode, and several methods have been proposed for promoting these diffusions in the positive compartment. These methods, however, do not make it possible to solve the problems caused by the local excess currents across the separator when these excess currents result from phenomena inherent in the negative compartment, these phenomena taking place more particularly at the metal-separator interface.

Several solutions have been proposed to try to eliminate these local excess currents inherent in the negative compartment by maintaining the working surface of the solid separator on the negative-compartment side constant.

Thus in a first type of solution it has been contemplated to provide the generators with reservoirs arranged above the negative compartment containing the entire quantity of metal necessary for a discharge, these reservoirs receiving the metal upon the charging. The metal contained in the negative compartment then constitutes deadweight which is prejudicial to the energy per unit of weight of the generators. Furthermore, the use of this solution frequently requires welds which place the metal in contact with materials other than the separator. This results in an attack of these materials, with a dissolving within the liquid metal of foreign ions which disturb the operation of the generators. Losses in tightness also occur at the welds, or even breaks, which raises serious problems of safety.

In a second type of solution, it has been contemplated to develop the base of the negative compartment by means of a separator which is then in flat and horizontal shape. This solution permits an improvement of the energy per unit of weight delivered by the generators but is does not make it possible to solve the above-mentioned weld problems.

It furthermore, in the case of the sodium-sulfur generators, accentuates the problems of polysulfides-separator wetting on the positive-compartment side, as a result of variations in volume of the sulfur compounds during each charge-discharge cycle.

A third type of solution consists in producing a siphon in the negative compartment. This solution substantially complicates the technology of the devices. In a fourth type of solution it has been attempted to promote the wetting and capillarity phenomena in the negative compartment by means of wetting agents (for example, metal salts) or felts impregnated with metal, which are maintained in contact with the separator by mechanical means, in particular grids or springs. This solution raises, with even greater acuity than the preceding ones, the problem of homogeneity of the metal-separator interface electrical resistance in the working zone, that is to say in the zone where the migration of the ions takes place, as a result of point defects in wetting.

The object of the invention is to avoid these drawbacks.

Therefore, the electrochemical device in accordance with the invention, which comprises at least one cell, said cell having, on the one hand, at least one negative compartment containing a so-called negative medium formed at least in part of at least one metal in liquid state under the operating conditions of the device, and, on the other hand, at least one positive compartment containing a so-called positive medium, these negative and positive compartments being separated by a solid wall, known as the separator, which is capable of being traversed by ions of the metal and is a conductor of said ions, during the operation of the electrochemical device, is characterized by the fact that the negative compartment contains at least one solid electrolyte which is a conductor of said ions of the metal, so that:

(a) the solid electrolyte separates the negative compartment into two regions:
   one region, called the negative region, containing the negative medium and at least one negative collector,
   one region, called the intermediate region, located between the separator and the electrolyte, so that during the operation of the device the transfer of metal from one of these regions to the other remains assured by ionic migration through the electrolyte;

(b) the intermediate region contains a medium, called the intermediate medium, formed at least in part of the metal in liquid state and/or of at least one salt of the metal in dissolved or molten state;

the device thus resulting from the placing in series of two electrochemical systems, one formed of the chain: negative medium/solid electrolyte/intermediate medium, and the other formed by the chain: intermediate medium/solid separator/positive medium, these chains having the intermediate medium in common.

The invention also relates to the processes used in the devices in accordance with the invention.

The invention will be easily understood by means of the following nonlimitative examples and figures of the drawing. In these figures, which are all schematic sections:

FIG. 1 represents an electrochemical device in accordance with the invention;

FIGS. 2 and 3 each represent another electrochemical device in accordance with the invention, these devices being generators of the sodium-sulfur type;

Figure 1:
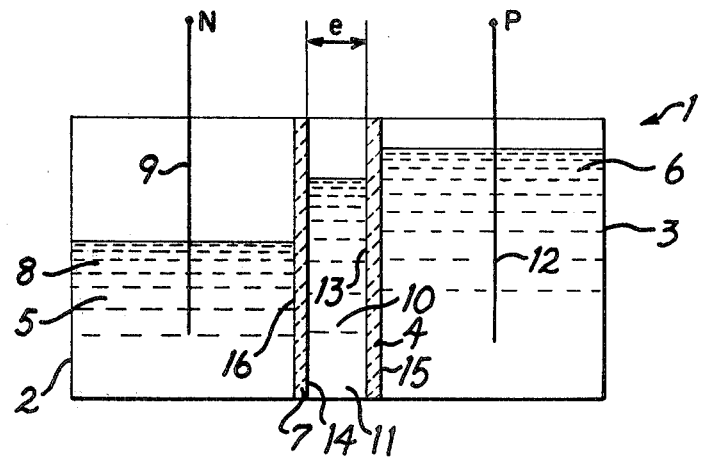

FIG. 1 shows an electrochemical device 1 in accordance with the invention. This device, formed of a single cell, has a negative compartment 2 and a positive compartment 3, these two compartments being separated by a solid separator 4. The negative compartment 2 contains a negative medium 5, comprising at least one metal in liquid state. The positive compartment 3 contains a positive medium 6. The negative compartment 2 includes a solid electrolyte 7, which separates the negative compartment 2 into two regions: on the one hand, a negative region 8 in which the negative medium 5 and a negative collector 9 are located, said collector 9 being electrically connected with the terminal N located outside the negative compartment 2, and, on the other hand, an intermediate region 10 contained between the solid separator 4 and the solid electrolyte 7. This intermediate region 10 contains an intermediate medium 11. The solid separator 4, the solid electrolyte 7 and the intermediate medium 11 are conductors of the ions of the metal. The positive compartment 3 contains the positive collector 12 connected electrically with the terminal P located outside the positive compartment 3.

A face 13 of the solid separator 4 and a face 14 of the solid electrolyte 7 face the intermediate region 10, $S_{13}$ and $S_{14}$ representing the surfaces in contact with the intermediate medium 11 of the respective faces 13 and 14. A face 15 of the solid separator 4 faces the positive compartment 3, $S_{15}$ representing the surface of this face 15 in contact with the positive medium 6. A face 16 of the solid electrolyte 7 faces the negative region 8, $S_{16}$ representing the surface in contact with the negative medium 5 of said face 16.

If the device 1 is an electrolytic device, a voltage is applied between the terminals P and N by means of an outside source of current (not shown). The positive medium then contains at least one compound of the metal. Ions of the metal migrate in succession through the solid separator 4, the intermediate medium 11 and the solid electrolyte 7 and penetrate into the negative region 8 where they capture electrons delivered by the negative collector 9 to form the metal. If the device 1 is an electrochemical generator of electric current, the process is the reverse during its discharge. The ions migrate into the positive compartment 3 passing successively through the solid electrolyte 7, the intermediate medium 11, and the solid separator 4. During the operation of the device 1, the metal can move between the regions 8 and 10 only by migration of its ions through the electrolyte 7.

The intermediate medium 11 is formed, at least in part, of the metal in liquid state and/or of at least one salt of the metal in dissolved or molten state. The device 1 results therefore from the placing in series of two electrochemical systems formed:

one by the chain:
   negative medium/solid electrolyte/intermediate medium;
the other by the chain:
   intermediate medium/solid separator/positive medium.

These chains have the intermediate medium in common.

During the operation of the device 1, the mass and the composition of the intermediate medium 11 are not modified by the passage of a stream of ions of the metal between the compartments 2 and 3, since, under the effect of this stream, as many ions penetrate into the intermediate medium 11 through one of the walls 4 and 7 as emerge from said intermediate medium through the other wall 7 or 4. Under these conditions, the surfaces $S_{13}$ remains invariant and for a given total current intensity passing through the device 1 the current density through the separator 4 depends only on surface $S_{15}$. It is furthermore unexpectedly found that the total electrical resistance of the device 1 does not vary substantially during its operation when surface $S_{16}$ varies. It is then sufficient to determine the minimum value of surface $S_{16}$ such that the current density passing through the electrolyte 7 does not exceed a preestablished value. This value can be high, for instance on the order of 1500 mA per cm² of surface $S_{16}$ in the case of $\beta$ or $\beta''$ sodium alumina. Each of the faces 13, 14, 15, 16 can have very different shapes; they may, for instance, be flat or formed of adjoining flat facets, or at least in part curved. The thickness of the separator 4 is constant in the working zone. The same is preferably true of the electrolyte 7. The space "e" between the opposing faces 13 and 14, which is preferably practically constant in the working zone, may be selected small in order to decrease the volume and the deadweight of the device 1, the space "e" being for instance on the order of 0.5 mm. It may possibly be advantageous, in order to simplify the construction of the device 1, to employ the same material for the walls 4 and 7 and/or to give them the same thickness, without this being necessary.

Figure 2:
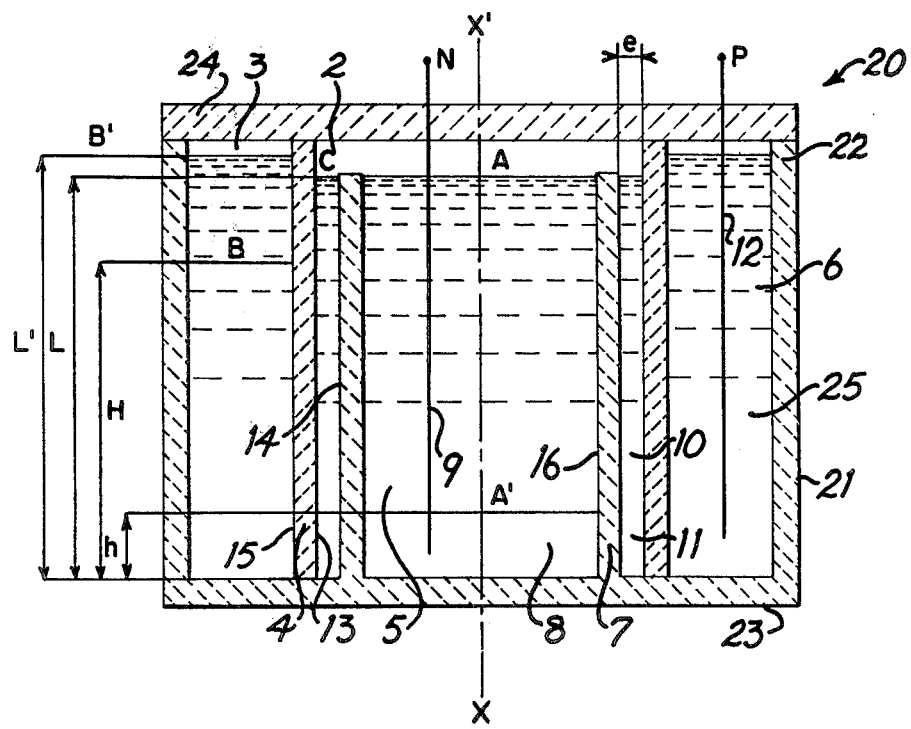

FIG. 2 represents another device in accordance with the invention, this device 20 being a generator of the sodium-sulfur type.

The reference numbers 2 to 16 and the symbols "e", P, N, $S_{13}$, $S_{14}$, $S_{15}$, $S_{16}$ haved the same meanings as previously. The walls 4 and 7 have the shape of cylinders of revolution with the same axis XX', for instance a practically vertical axis. The housing 21 of the generator 20 has the shape of a cup whose wall 22 has the shape of a cylinder of revolution having the same axis XX' as the walls 4 and 7 which both join with the bottom 23 of the housing 21. The negative compartment 2 is located on the inside of the separator cylinder 4 and the positive compartment 3 is located between the housing 21 and the separator cylinder 4. The intermediate region 10 is located between the separator cylinder 4 and the solid electrolyte cylinder 7 and the negative region 8 is located on the inside of the solid electrolyte cylinder 7.

A cover 24 closes the upper part of the generator 20, this cover 24 resting, for instance, on the wall 22 and the separator 4.

The generator 20 is developed, for instance, in the following manner:

- separator 4 and electrolyte 7 made of $\beta''$ sodium alumina, the resistivity of which to Na+ ions is close to $3\Omega$ cm, these walls being practically non-porous;
- thicknesses of the walls 4 and 7 equal and close to 1 mm;
- space "e" between the walls 4 and 7 close to 1 mm;
- the negative region 8 contains at the beginning of discharge 4.3 g. of molten sodium constituting the negative medium 5;
- the positive compartment 3 contains at the beginning of discharge a felt 25 of graphite impregnated with 22.8 g. of molten $Na_2S_5$ (sodium pentasulfide) constituting the positive medium 6;
- the intermediate region 10 is filled with 0.25 g. of molten sodium.

The operating conditions of the generator 20 are for instance as follows:

At the start of the discharge, the level of the sodium in the negative region 8 is represented by the line A located at the distance L from the horizontal bottom 23 of the housing 21, L being practically equal to 5 cm.

The level of $Na_xS_5$ in the positive compartment 3 is then represented by the line B, and the level of the intermediate medium 11 is represented by the line C. The lines A and C are, for instance, located substantially at the same distance L from the bottom 23. The line B is located at a distance H from the bottom 23 which is less than L, this distance H being about 4.3 cm.

At the start of the discharge, $S_{13}$ and $S_{16}$ have the following values:

$S_{13} = 26.5$ cm$^2$ — $S_{16} = 19$ cm$^2$.

During the discharge of the generator 20 into an outside discharge circuit (not shown) arranged between the terminals P and N, the following events take place:

- the level A of sodium drops in the negative region 8, reaching at the end of the discharge the level A' located at the distance h from the bottom 23, h being substantially equal to 1 cm. The distance h may be substantially less, under these conditions of operation, for a mass of positive medium greater than that used in the example;
- the level C of the intermediate medium 11 remains constant;
- the level B of the positive medium rises in the positive compartment 3 reaching, at the end of discharge, the level B' located at the distance L' from the bottom 23, which corresponds approximately to the total interior height of the negative compartment 2 and positive compartment 3; this positive medium consists of a mixture of sodium polysulfides whose composition at the end of the discharge is close to $Na_2S_3$ (sodium trisulfide);
- during the discharge time, which is at least 45 minutes, the instantaneous current intensity Id delivered into the discharge circuit does not exceed 5A, so that the instantaneous current density of Na+ ions, $i_4 = Id/S_{13}$, penetrating into the separator 4 is less than 200 mA/cm$^2$; the operation of the positive compartment is thus facilitated:
- the instantaneous ionic current density $i_7 = Id/S_{16}$ penetrating into the electrolyte 7 is about 260 mA/cm$^2$ at the start of the discharge; this density increases gradually, reaching about 1300 mA/cm$^2$ at the end of the discharge.

The operation of the generator 20 takes place in the opposite direction during charging, that is to say when causing a migration of the Na+ ions from the positive compartment 3 towards the negative region 8 due to an outer source of current (not shown) applied to the terminals P and N, $i_4$ and $i_7$ then representing the ionic current densities coming from the separator 4 and the electrolyte 7, respectively, $i_4$ remaining less than 200 mA/cm$^2$ and $i_7$ decreasing. At the end of the charge, the levels of the negative medium 5 and of the positive medium 6 are reestablished at A and B, respectively, as at the start of the discharge, the level C of the intermediate medium 11 in this case also remaining constant.

Operation of the generator 20 in charge and discharge cycles at a temperature of about 350° C. has made it possible to make the following findings:

- the volume of sodium contained in the negative region 8 could be used at 80% of its theoretical capacity equal to 7 Wh, and this for several hundreds of charge-discharge cycles, the practical discharge and charge rates, that is to say the current densities $i_4$ and $i_7$, being limited only by the operation of the positive compartment,
- the use of the two walls 4 and 7 increases the safety of operation of the generator; as a matter of fact, if a sudden cracking of the separator 4 takes place, the quantities of polysulfides and sodium brought together are negligible in view of the small volume of the intermediate medium 11; and if a sudden cracking of the electrolyte 7 takes place, the overall apparent resistance of the cell decreases rapidly, which makes it possible to detect this cracking,
- the regularity of operation of the generator 20 as well as the improvement in safety make it possible to decrease the thicknesses of the walls 4 and 7 as compared with the thickness of a single wall, so that the overall internal resistance of the generator 20 is practically the same as that of a known sodium-sulfur generator of the same theoretical energy per unit of weight.

For clarity of the drawing, the solid electrolyte 7 does not reach the cover 24, but one can contemplate an embodiment such that the electrolyte 7 is in contact both with the bottom 23 and with the cover 24 so as to hermetically separate the positive medium, the intermediate medium and the negative medium for reasons of safety.

The level C in the intermediate medium 11 has been shown at a height close to that of the maximum level B' of the positive medium corresponding to the discharged condition so as to take advantage of a maximum working surface throughout the charge-discharge cycle and optimally utilize the volumes available, but other arrangements are possible.

An intermediate medium 11 other than molten sodium can be arranged in the intermediate region 10, which medium must be permeable to the Na+ ions and compatible with the separator 4 and the electrolyte 7. Such a medium may consist, for instance, of molten sodium salts, in particular sodium tetrachloroaluminate or a mixture of sodium tetrachloroaluminate and sodium chloride, or of sodium salts, in particular one or more halides, in solution in an organic liquid, particularly propylene carbonate, N,N'-dimethylformamide, alone or in mixture. It should be noted furthermore that the invention applies to the case that the sodium in the negative compartment 2 is in solution in a solvent, for instance hexamethylphosphotriamide. These various solutions may have the advantage of lowering the temperature of use of the generator 20. The positive medium 6 may comprise electron acceptor substances other than sulfur and/or sodium polysulfides, for instance other metal salts, particularly halides of transition metals.

The invention also applies to the event that the negative medium contains, in addition to the sodium, at least one other metal, for instance another alkali metal. This solution may also possibly have the advantage of lowering the temperature of use of the generator 20, in particular when the metals are in alloy state.

When the ions of this other metal participate in the electrochemical reactions, it is necessary for the walls 4 and 7 and the intermediate medium 11 to be permeable to these ions, which can be obtained, for instance, if these walls and this medium contain this other metal in free state or in combined state. In the latter case, it is obvious that the total number of cation charges remains constant but that the relative proportions of the cations in the intermediate region may vary during the charge-discharge cycle.

Figure 3:
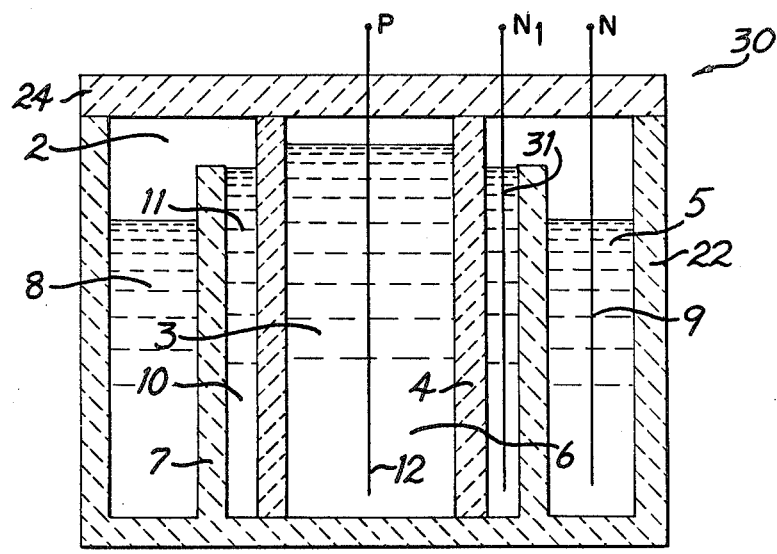

FIG. 3 represents another generator in accordance with the invention. This generator 30 of the sodium-sulfur type is similar to the generator 20 previously described, with the difference that the positive compartment 3 is located in the central portion of the generator within the solid separator cylinder 4. The solid electrolyte cylinder 7 is located on the outside of the separator cylinder 4, and the negative region 8 is disposed between the wall 22 and the electrolyte 7. Furthermore, in this generator 30 an auxiliary collector 31 extends down into the intermediate medium 11, this auxiliary collector 31 being connected to the terminal $N_1$. One can thus effect the filling of the intermediate region 10 located between the walls 4 and 7 by electrolysis of the positive medium 6 by applying an electric voltage between the terminals P and $N_1$ by means of an external source of current (not shown) or by transfer of ions from the negative medium towards the intermediate medium by applying an electric voltage between the terminals N and $N_1$ of the device, the charge and discharge cycles previously described being carried out between the terminals P and N. It goes without saying that this electrolytic filling can be applied to other devices in accordance with the invention.

Figure 4:
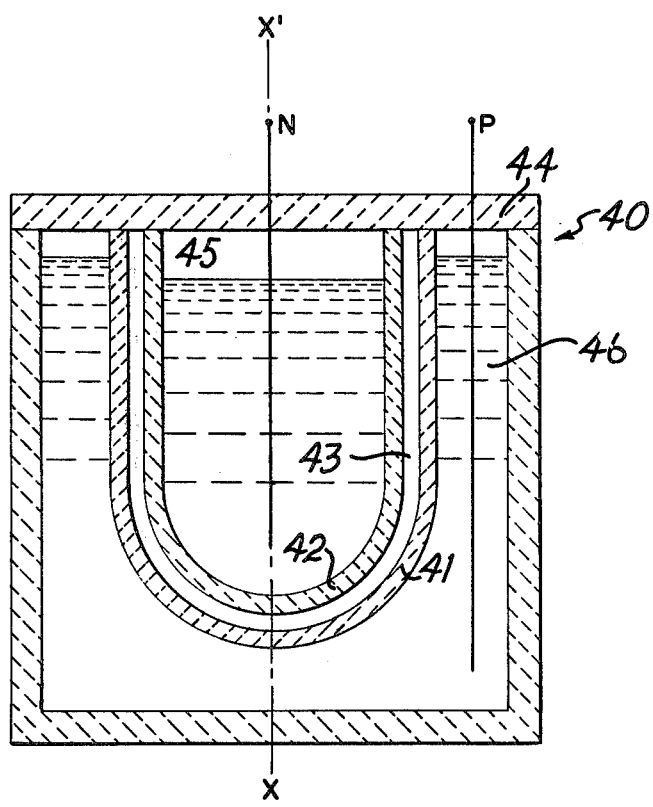
FIG. 4 represents another electrochemical device in accordance with the invention, this device having closed tubes.

FIG. 4 represents another electrochemical device in accordance with the invention. In this device 40, the solid separator, and the solid electrolyte have the form of tubes closed at their lower end, these tubes being marked 41 and 42, respectively. The solid electrolyte tube 42 is arranged within the solid separator tube 41 and the intermediate region 43 corresponds to the volume separating these tubes, which are preferably bodies of revolution around the common axis XX'. The tubes 41 and 42 are connected at their open part to the cover 44. The negative region 45 is located on the interior of the electrolyte tube 42 and the positive compartment 46 is located on the outside of the separator tube 41, but the opposite arrangement is possible.

Figure 5:
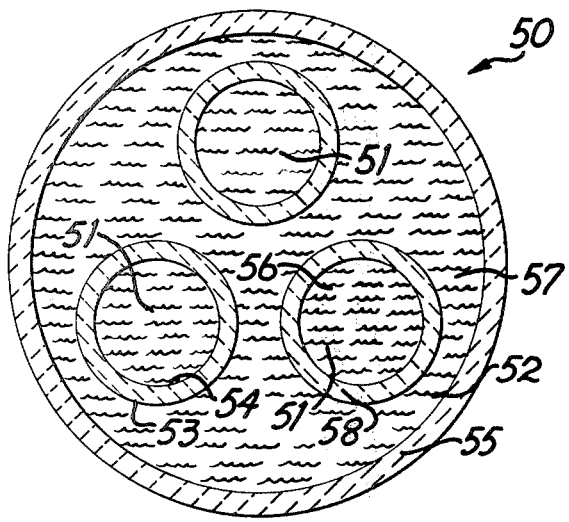
FIG. 5 represents another electrochemical device in accordance with the invention, this device being formed of a cell composed of three negative compartments and one positive compartment.

The invention applies to cells each having more than one negative and/or positive compartment. FIG. 5 represents a device 50 in accordance with the invention formed of a cell having, for instance, three negative compartments 51 arranged within a positive compartment 52.

Each negative compartment 51 is limited by a solid separator 53 and has a solid electrolyte 54 located concentrically within the separator 53, all these walls 53 and 54 being arranged within an enclosure 55, these walls and said enclosure being, for instance, of tubular shape. The negative medium 56 of each negative compartment 51 is arranged on the inside of the corresponding electrolyte tube 54 and the positive medium 57 of the cell 50 is disposed in the space located between the enclosure 55 and the separators 53, this space corresponding to the positive compartment 52.

The intermediate mediums 58 are disposed between the separators 53 and the corresponding concentric electrolyte tubes 54.

Figure 7:
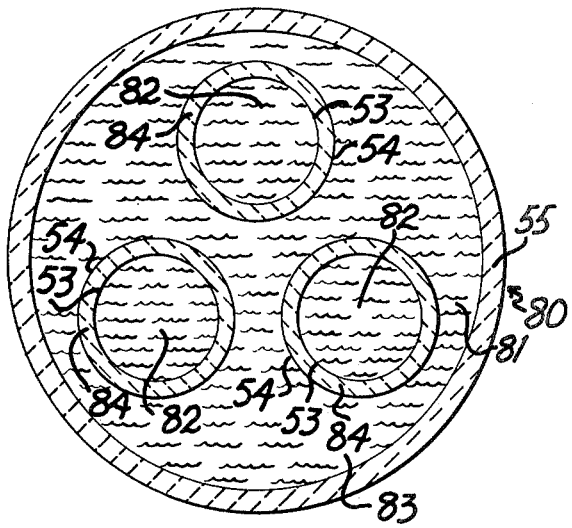
FIG. 7 represents another electrochemical device in accordance with the invention, this device being formed of a cell comprising a negative compartment and three positive compartments.

FIG. 7 represents another electrochemical device in accordance with the invention. This device 80 is similar to the device 50 with the difference that each solid separator tube 53 is arranged on the inside of a concentric solid electrolyte tube 54. The device 80 has, therefore, a negative compartment 81 corresponding to the volume included between the enclosure 55 and the separator tubes 53 and three positive compartments 82 arranged on the inside of the separator tubes 53. Each electrolyte tube 54 of the device 80 separates the negative compartment 81 into two regions—a negative region 83 located on the outside of this electrolyte tube 54 and an intermediate region 84 located between this electrolyte tube 54 and the separator tube 53 which it surrounds.

A preferred embodiment of the invention consists in preparing the solid separator and the solid electrolyte by machining, for instance, with a drill, from a block of material which conducts the ions of the metal, other walls being possibly prepared by this same machining operation.

Figure 6:
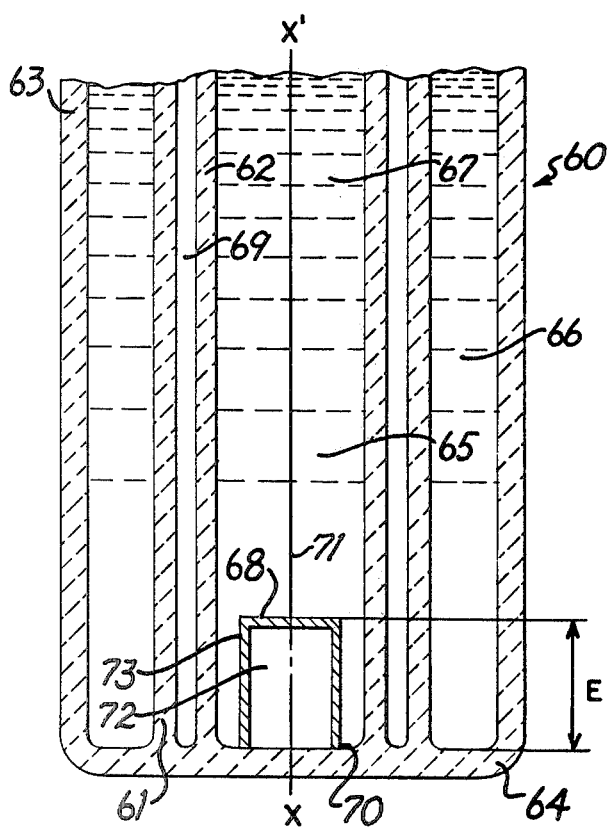
FIG. 6 represents another electrochemical device in accordance with the invention, this device being produced by machining from a block of material which conducts the ions of the metal.

FIG. 6 represents such an electrochemical device 60 formed of one cell. The solid separator 61, the solid electrolyte 62 as well as the outer wall 63 have the shape of cylinders of revolution with the common axis XX', which is for instance practically vertical, and they have been made by drilling a block of practically nonporous solid material which conducts the ions of the metal, for instance a sintered block of $\beta$ or $\beta''$ sodium alumina when the metal is sodium. For simplification of the drawing, only the lower part of the device 60 has been shown.

The bottom 64 which connects the outer wall 63, the separator 61 and the electrolyte 62 is formed of a part of this machined block. This solution has the following advantages:

- it assures perfect uniformity of the geometrical dimensions of the cell 60, in particular a constant thickness of the solid separator 61 and of the solid electrolyte 62 and a constant space between these walls 61 and 62 as well as perfect centering; such uniformity is difficult to obtain by other methods in view of the small values desired for the thicknesses involved;
- it permits satisfactory homogeneity of the electrical properties of the separator 61 and of the electrolyte 62, since machining from the solid makes it possible to eliminate surface parts which have altered during the various manufacturing operations of the block.

In the device 60 the negative compartment 67 is located on the inside of the solid separator cylinder 61, the negative region 65 is located on the inside of the solid electrolyte cylinder 62 and the intermediate region 69 is formed of the space present between the separator 61 and the electrolyte 62, the positive compartment 66 being arranged between the outer wall 63 and the separator 61. It is clear that the technique of machining by drilling can be applied in the event that the negative and positive compartments have the opposite positions, that is to say when the central compartment is the positive compartment and the annular compartment is the negative compartment.

The negative region 65 is provided at its lower portion with a part 68 made of an electronically conductive material, for instance graphite or metal. This part 68 has, for instance, the shape of an inverted cup, the lower open end 70 of which is fastened in the bottom 64. This part 68 of height E equal, for instance, to one fith of the maximum working height of the electrolyte 62, is electrically connected to the eletronic conductor 71 with which it constitutes the negative collector of the cell, and the inner space 72 which it defines is empty of negative medium. The minimum volume of negative medium at the end of discharge therefore corresponds to the annular volume present between the electrolyte 62 and the facing wall 73 of the part 68, this wall 73 being, for instance, vertical and a body of revolution around the axis XX'. The space between the electrolyte 62 and the wall 73 can be small, for instance on the order of 0.5 mm., in the event that the device 60 is a generator of the sodium-sulfur type. The weight of the minimum volume of negative medium, that is to say the deadweight of negative medium, is thus substantially reduced, which deadweight can be on the order of 1% to 2% only of the weight of sodium at the start of the discharge when the device 60 is a generator of the sodium-sulfur type and when the inside diameter of the electrolyte 62 is about 1 cm. One thus further decreases the weight of the device 60. Other forms of parts 68 are possible, for instance closed parts applied or not against the bottom 64.

It is furthermore possible to make the part 68 of an electronically nonconductive material, but it is then necessary for the negative collector 71 to penetrate into the annular space present between the electrolyte 62 and the facing wall 73, which may complicate the construction of the device 60.

Accessories can be arranged in the space 72, for instance heating or cooling elements. When the positive compartment is central and the negative compartment annular, the part 68 is preferably of annular shape. It is clear that the arrangements of the generator 60 which have been described above apply to the devices in accordance with the invention even if they are not made by machining with a drill.

Of course, the invention is not limited to the embodiments described above, on basis of which one can contemplate other methods and forms of embodiments without thereby going beyond the scope of the invention. Thus, for instance, the devices in accordance with the invention may possibly comprise a plurality of cells assembled, in particular, in series or in parallel.

What is claimed is:

1. Electrochemical device comprising at least one cell, said cell having, on the one hand, at least one negative compartment containing a negative medium formed at least in part of at least one metal of groups 1a, 2a, 2b, 3a of the periodic classification of elements, said metal being in liquid state under the operating conditions of the device, and, on the other hand, at least one positive compartment containing a positive medium formed at least in part by at least one material selected from the group consisting of chalcogens, compounds of chalcogens with said metal or with transition metals, halides of transition metals, said negative and positive compartments being separated by a solid separator which is capable of being traversed only by ions of said metal and is a conductor of said ions, during the operation of the electrochemical device, characterized by the fact that the negative compartment contains at least one solid electrolyte which is capable of being traversed only by said ions of said metal and which is a conductor of said ions, so that:

(a) the solid electrolyte separates the negative compartment into two regions:
     one negative region containing the negative medium and at least one negative collector,
     one intermediate region, located between the separator and the electrolyte, so that during the operation of the device the transfer of metal from one of these regions to the other remains assured by mere ionic migration through the electrolyte;
   (b) the intermediate region contains an intermediate medium formed at least in part by at least one material selected from the group consisting of said metal in liquid state and the salts of said metal in dissolved or molten state; the device thus resulting from the placing in series of two electrochemical systems, one formed of the chain: negative medium/solid electrolyte/intermediate medium, and the other formed of the chain: intermediate medium/solid separator/positive medium, these chains having the intermediate medium in common.

2. Electrochemical device according to claim 1, characterized by the fact that the space between the facing faces of the separator and the electrolyte is substantially constant at the place where the intermediate medium is present.

3. Electrochemical device according to claim 1 or claim 2, characterized by the fact that the separator and the electrolyte have the shape of cylinders of revolution around the same axis.

4. Electrochemical device according to claim 1 or claim 2, characterized by the fact that the separator and the electrolyte have the shape of nested tubes of revolution around the same axis.

5. Electrochemical device according to claim 1, characterized by the fact that it is of practically vertical orientation.

6. Electrochemical device according to claim 5, characterized by the fact that the deadweight of negative medium is reduced by means of a part arranged at the lower portion of the negative region, said part being empty on the inside of negative medium.

7. Electrochemical device according to claim 6, characterized by the fact that the part encloses heating or cooling elements.

8. Electrochemical device according to claim 1, characterized by the fact that the separator and the electrolyte are made by machining from a block of material which conducts the ions of the metal.

9. Electrochemical device according to claim 1, characterized by the fact that during the operation of the device the mass and the composition of the intermediate medium remain constant.

10. Electrochemical device according to claim 1, characterized by the fact that the metal is sodium and by the fact that the solid separator and the electrolyte are each made of a material selected from the group consisting of $\beta$-sodium alumina, $\beta''$-sodium alumina, and mixtures of $\beta$-sodium alumina and $\beta''$-sodium alumina.

11. Electrochemical device according to claim 1, characterized by the fact that it is an electrochemical generator of electric current.

12. A process which consists in the carrying out of electrochemical reactions in a device according to claim 1.

* * * * *

UNITED STATES PATENT AND TRADEMARK OFFICE
CERTIFICATE OF CORRECTION

PATENT NO. : 4,216,273
DATED : August 5, 1980
INVENTOR(S) : Francois Cadart et al It is certified that error appears in the above-identified patent and that said Letters Patent are hereby corrected as shown below:

First page, second column, second line, "May 19, 1978" should read -- May 19, 1975 --. Col. 4, line 51, "surfaces" should read -- surface --. Col. 5, line 13, "haved" should read -- have --; line 56, "Na$_S$S$_5$" should read -- Na$_2$S$_5$ --.

Signed and Sealed this

Twenty-fifth Day of November 1980

[SEAL]

Attest:

SIDNEY A. DIAMOND

Attesting Officer

Commissioner of Patents and Trademarks